(12) United States Patent
Janik et al.

(10) Patent No.: US 7,660,601 B2
(45) Date of Patent: Feb. 9, 2010

(54) WEBPAD AND METHOD FOR USING THE SAME

(76) Inventors: Craig M. Janik, 25566 Fernhill Dr., Los Altos Hills, CA (US) 94024; Nick R. Kalayjian, 2299 Sacramento St., San Francisco, CA (US) 94115; Bruce P. Edwards, 2319 Polk St., San Francisco, CA (US) 94109; Joshua W. Ferguson, 59 Mirabel Ave., San Francisco, CA (US) 94110

( * ) Notice: Subject to any disclaimer, the term of this patent is extended or adjusted under 35 U.S.C. 154(b) by 415 days.

(21) Appl. No.: 11/169,354

(22) Filed: Jun. 29, 2005

(65) Prior Publication Data

US 2005/0250449 A1 Nov. 10, 2005

Related U.S. Application Data

(63) Continuation of application No. 09/946,946, filed on Sep. 4, 2001, now abandoned.

(60) Provisional application No. 60/230,084, filed on Sep. 5, 2000.

(51) Int. Cl.
*H04M 1/00* (2006.01)
*H04B 7/00* (2006.01)

(52) U.S. Cl. ............... 455/556.1; 455/556.2; 455/41.3; 320/137

(58) Field of Classification Search ............ 455/556.1, 455/556.2, 557, 573, 41.3; 361/728, 679.55, 361/679.56; 379/428.02; 701/303; 439/945
See application file for complete search history.

(56) References Cited

U.S. PATENT DOCUMENTS

| | | | |
|---|---|---|---|
| 5,434,860 A | 7/1995 | Riddle | |
| 5,488,572 A * | 1/1996 | Belmont | 710/62 |
| 5,606,594 A | 2/1997 | Register et al. | |
| 5,644,471 A | 7/1997 | Schultz et al. | |
| 5,721,827 A | 2/1998 | Logan et al. | |
| 5,724,567 A | 3/1998 | Rose et al. | |
| 5,739,665 A * | 4/1998 | Bares | 320/115 |
| 5,742,599 A | 4/1998 | Lin et al. | |
| 5,758,257 A | 5/1998 | Herz et al. | |
| 5,768,100 A | 6/1998 | Barrus et al. | |
| 5,790,935 A | 8/1998 | Payton | |
| 5,793,980 A | 8/1998 | Glaser et al. | |
| 5,822,546 A * | 10/1998 | George | 710/303 |
| 5,831,664 A | 11/1998 | Wharton et al. | |

(Continued)

FOREIGN PATENT DOCUMENTS

| | | |
|---|---|---|
| EP | 0 945 818 | 9/1999 |
| EP | 0992921 A2 | 4/2000 |
| EP | 0909112 B1 | 1/2004 |
| GB | 2312591 A | 10/1997 |
| WO | 9918506 A1 | 4/1999 |

(Continued)

OTHER PUBLICATIONS

National Semiconductor, "WebPAD-Portable Web Access (datasheet)" 800605-001, Online Jul. 22, 1999, XP002202548, Retrieved from the Internet on Jun. 18, 2002, <URL:http://aldebaran.elo.utfsm.cl/datasheet/national/pdf/nsc04795.pdf>.

(Continued)

*Primary Examiner*—George Eng
*Assistant Examiner*—Nam Huynh (57) ABSTRACT

A webpad and method for using the same are provided. The webpad includes an adapter module attached to a personal digital assistant. The adapter module includes a wireless transceiver for sending and receiving data via a wireless communication protocol.

18 Claims, 6 Drawing Sheets

U.S. PATENT DOCUMENTS

| | | | |
|---|---|---|---|
| 5,882,220 | A | 3/1999 | Horii et al. |
| 5,884,028 | A | 3/1999 | Kindell et al. |
| 5,889,506 | A | 3/1999 | Lopresti et al. |
| 5,890,016 | A | 3/1999 | Tso |
| 5,905,523 | A | 5/1999 | Woodfield et al. |
| 5,926,624 | A | 7/1999 | Katz et al. |
| 5,946,637 | A * | 8/1999 | Umbach et al. ............. 455/573 |
| 5,991,306 | A | 11/1999 | Burns et al. |
| 6,005,566 | A | 12/1999 | Jones et al. |
| 6,065,880 | A | 5/2000 | Thompson |
| 6,115,248 | A | 9/2000 | Canova et al. |
| 6,243,581 | B1 | 6/2001 | Jawanda |
| 6,263,503 | B1 | 7/2001 | Margulis |
| 6,265,845 | B1 * | 7/2001 | Bo et al. ..................... 320/113 |
| 6,266,539 | B1 * | 7/2001 | Pardo ..................... 455/556.2 |
| 6,351,467 | B1 | 2/2002 | Dillon |
| 6,377,825 | B1 * | 4/2002 | Kennedy et al. ......... 455/569.2 |
| 6,424,369 | B1 | 7/2002 | Adair et al. |
| 6,434,403 | B1 | 8/2002 | Ausems et al. |
| 6,434,747 | B1 | 8/2002 | Khoo et al. |
| 6,453,355 | B1 | 9/2002 | Jones et al. |
| 6,484,212 | B1 | 11/2002 | Markowitz et al. |
| 6,516,202 | B1 * | 2/2003 | Hawkins et al. ......... 455/556.2 |
| 6,518,902 | B2 | 2/2003 | Panasik et al. |
| 6,526,581 | B1 | 2/2003 | Edson |
| 6,542,721 | B2 | 4/2003 | Boesen |
| 6,557,756 | B1 | 5/2003 | Smith |
| 6,577,849 | B1 | 6/2003 | Eaton et al. |
| 6,581,103 | B1 | 6/2003 | Dengler |
| 6,597,924 | B1 * | 7/2003 | Smith ......................... 455/557 |
| 6,633,482 | B2 * | 10/2003 | Rode ..................... 361/679.4 |
| 6,657,654 | B2 | 12/2003 | Narayanaswami |
| 6,678,215 | B1 | 1/2004 | Treyz et al. |
| 6,678,536 | B2 | 1/2004 | Fletcher et al. |
| 6,678,737 | B1 | 1/2004 | Bucher |
| 6,700,893 | B1 | 3/2004 | Radha et al. |
| 6,708,213 | B1 | 3/2004 | Bommaiah et al. |
| 6,708,217 | B1 | 3/2004 | Colson et al. |
| 6,717,952 | B2 | 4/2004 | Jones et al. |
| 6,744,763 | B1 | 6/2004 | Jones et al. |
| 6,826,283 | B1 | 11/2004 | Wheeler et al. |
| 6,829,648 | B1 | 12/2004 | Jones et al. |
| 6,832,288 | B2 | 12/2004 | Du Val |
| 6,834,308 | B1 | 12/2004 | Ikezoye et al. |
| 7,117,516 | B2 | 10/2006 | Khoo et al. |
| 7,191,242 | B1 | 3/2007 | Serenyi et al. |
| 7,366,788 | B2 | 4/2008 | Jones et al. |
| 2002/0056112 | A1 | 5/2002 | Dureau et al. |

FOREIGN PATENT DOCUMENTS

| | | |
|---|---|---|
| WO | WO 99/65209 | 12/1999 |
| WO | 0023899 A1 | 4/2000 |
| WO | WO 00/36757 | 6/2000 |
| WO | WO 00/43905 | 7/2000 |
| WO | 0049731 A1 | 8/2000 |
| WO | 0110124 A1 | 2/2001 |
| WO | 0147192 A1 | 6/2001 |
| WO | WO 02/21248 A1 | 3/2002 |

OTHER PUBLICATIONS

National Semiconductor, "The Age of Information Access", Online Jun. 12, 1999, XP002202547, Retrieved from the Internet on Jun. 18, 2002, <URL:http://aldebaran.elo.utfsm.cl/datasheet/national/htm/nsc00958.htm>.

Truman, T.E. et al., "The InfoPad Multimedia Terminal: A Portable Device for Wireless Information Access", IEEE Transactions on Computers, IEEE Inc., New York, USA, vol. 47, No. 10, Oct. 1, 1998, pp. 1073-1087, XP000781992, ISSN: 0018-9340.

Sheng, S. et al., "A Portable Multimedia Terminal", IEEE Communications Magazine, IEEE Service Center, Piscataway, New York, USA, vol. 30, No. 12, Dec. 1, 1992, pp. 64-75, XP000330091, ISSN: 0163-6804.

PR Newswire, New Company Xenote Allows Consumers to 'Bookmark the Real World' with Fun, Personal Internet Device, Jan. 25, 2000, 2pgs.

G. Degoulet et al., EPEOS—Automatic Program Recording System, Nov. 1975, 22 pgs.

Tivo, Inc., Form S-1, Jul. 22, 1999, 902 pgs.

International Search Report for PCT/US01/42050 mailed Dec. 19, 2001.

International Preliminary Examination Report for PCT/US01/42050 completed Dec. 2, 2002.

International Search Report for PCT/US01/27598 mailed Dec. 19, 2001.

IBM Technical Disclosure Bulletin, "Modular Docking Station," IBM Corp., vol. 34, No. 2, Jul. 1991, 2 pages.

International Preliminary Examination Report for PCT/US02/27598 completed Dec. 19, 2002.

International Search Report for PCT/US01/29348 mailed Jul. 2, 2002.

* cited by examiner

WEBPAD AND METHOD FOR USING THE SAME

RELATED APPLICATIONS

This application is a continuation of U.S. patent application Ser. No. 09/946,946 filed Sep. 4, 2001, which claims the benefit of U.S. Provisional Application No. 60/230,084, filed Sep. 5, 2000, both of which are incorporated herein by reference in their entirety.

FIELD OF THE INVENTION

The present invention relates generally to the field of personal digital assistants, and more particularly, to a webpad.

BACKGROUND

The rapid buildup of telecommunications infrastructure combined with substantial investment in Internet-based businesses and technology has brought Internet connectivity to a large segment of the population. Recent market statistics show that a majority of households in the U.S. own at least one personal computer (PC), and a significant number of these PCs are connected to the Internet. Although the majority of household PCs are connected to the Internet by dialup modem connections, broadband connectivity is being rapidly adopted, and is decreasing in price as a variety of technologies are introduced and compete in the marketplace. A large majority of households in the U.S. and Europe are viable for at least one or more type of broadband connection, such as cable, DSL, optical networks, fixed wireless, or two-way satellite transmission.

The rapid proliferation of low-cost processing power and Internet connectivity has driven the availability and popularity of digital content. Digitization combined with compression technology produces content that is small and portable. Consumer enthusiasm for digital audio files such as MP3-formatted content is a prime example of the trend toward content digitization, enabling consumers to efficiently share audio files that they have digitized from CDs. The creation and transfer of digital audio is now understood and desired by millions of consumers. The MP3 digital audio format is an audio encoding technology that allows consumers to further compress digital audio files such as those found on Compact Disks, to much smaller sizes with very little decrease in sound quality. PC-based MP3 software players have been created that provide a convenient graphical user interface and software decoding of MP3 files. Some technology allows users to play MP3 files on their PC, using an existing sound card with external speakers. However, to listen to MP3s the user must interface with the PC, using a mouse and keyboard, and must be nearby the PC sound output equipment.

Other content mediums are trending toward digitization. The processing and sharing of digital images is expected to increase geometrically as digital cameras gradually replace conventional film chemistry. Electronic texts (eBooks) are another example of how digitization enables more efficient and varied transfer of content. As system bandwidth increases, it is only a matter of time before digital video transport is as common as audio is now. Additionally, interactive multimedia (Flash and Shockwave) will increasingly be made available to end users with PCs.

A market for home networking technology has emerged, driven by the need to share an Internet connection between two or more PCs, and to connect all the PCs to productivity peripherals. There has been innovation in local area network (LAN) technology based on end-user desire for simplicity and ease of installation. The Home Phoneline Networking Association (HPNA) promotes networking products that turn existing phone wiring in the home into an Ethernet physical layer. Existing HPNA products provide data-rates equivalent to 10base-T Ethernet, approximately 10 Mbps. Networking technology that uses the AC power wiring in the home to carry data signals has also appeared. Similar to HPNA devices, adapters are required to convert data signals from devices into voltage fluctuations carried on to and off of the AC wires, allowing any AC outlet to become a network interface.

Wireless radio-frequency (RF) LAN technology has also been introduced into the home networking market. Theoretically, wireless technology is the most convenient for the end user to install. Two prevalent standards for wireless networking are Institute of Electrical and Electronics Engineers (IEEE) 802.11 b and HomeRF. Both of these systems utilize the unlicensed 2.4 Ghz ISM band as the carrier frequency for the transmission of data. Both of these technologies have effective ranges of approximately 150 feet in a typical household setting. In addition to utilizing Transmission Control Protocol/Internet Protocol (TCP/IP) protocols, IEEE 802.11 b and HomeRF include additional encryption and security protocol layers so that the user's devices have controlled access to data being sent through the LAN.

Although there is a significant installed base of PCs with access to large volumes of digital content via Internet connectivity, the value of that content is limited when it can only be experienced at the PC.

Portable digital audio playback devices have been developed that are significantly smaller than portable CD players because they contain no moving parts, only flash memory, a microprocessor for decoding MP3 compressed audio content, and batteries. However, the cost per bit of audio content with portable digital audio playback devices is still very high because of the high cost of flash memory. The typical portable digital audio playback device includes enough flash memory to store about one CD's worth of digital music. The result is that the user is burdened with having to continually manually change the music files in the device by plugging the device into the PC and operating a user interface, if they want to listen to a wide range of music.

PDAs and other portable handheld computers have achieved widespread market acceptance due to the valuable data manipulation, access, and storage functionality available in conveniently portable form factors. The innovation of pen-based user interfaces in combination with various types of character recognition technology has also been a factor in the high adoption rate of PDAs. The Palm Pilot.RTM. in particular has advanced the state of the art of handheld computing by offering a small, light form factor with an effective character recognition application called Graffiti.RTM. The Palm Pilot.RTM. uses the PalmOS.RTM. operating system. The Palm Pilot.RTM. is manufactured by Palm Computing, Inc. Other small form factor PDAs are available, such as the iPaq.RTM., manufactured by Compaq Computer, Inc. Casio, Inc. offers the Cassiopeia.RTM.

What is required is a system that allows a user to access all of the digital content and information services without being forced to sit at a PC.

SUMMARY OF THE INVENTION

A webpad and method for using the same are provided. The webpad includes an adapter module attached to a personal digital assistant. The adapter module includes a wireless transceiver for sending and receiving data via a wireless communication protocol.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A webpad and method for using the same are described. In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

A set of definitions is provided below to clarify the present invention.

Definitions

Personal Digital Assistants (hereafter PDAs) are defined as the category of computers that are small enough to be comfortably held in one hand, and that contain software applications that are used for personal organization, productivity, and communication. The PDA category includes handheld computers, including single-housing devices such as the Palm Pilot, which have a two-piece clam-shell plastic housing with an integral display. PDAs of this variety include an LCD that allows the user to write on it with a stylus, or otherwise control and manipulate the software and stored content on the PDA. There are also hinged designs for PDAs that are similar in configuration, although much smaller than, portable notebook computers. In this configuration, one housing contains the microprocessor, memory, batteries, and small keyboard, and the other housing contains an LCD.

A network is one or more computer devices of any type, such as a personal computer (PC), network appliance, or PDA, connected together by a data transfer link. A PDA that has a communication link to the Internet is often referred to as a node. A node (point of interaction with the Internet) on the network can potentially communicate, that is, can send or receive data to any other node (electronic device) on the network. Networks may be physically wired or they may be wireless.

The Internet is used interchangeably with the term web or worldwide web. Both of these are defined as the worldwide network of PCs, servers, and other devices.

A CCD (charged coupled device) is a semiconductor technology used to build light-sensitive electronic devices such as cameras. Each CCD chip consists of an array of light sensitive photocells that, in conjunction with a lens, can be used to capture both still shots and moving pictures. CCD technology is well known in the field of digital image acquisition and will not be described in detail here for reasons of brevity.

Broadband connection is defined as a communications network in which the frequency bandwidth can be divided and shared by multiple simultaneous signals. A broadband connection to the Internet typically provides minimum upstream and downstream data-rates of approximately 200K or more bits per second. There are many different types of broadband connections including DSL, cable modems, and fixed and mobile wireless connections.

A Data Over Cable System Interface Specification (DOCSIS) modem is an industry standard type of cable modem that is used to provide broadband access to the Internet over a coaxial cable physical layer that is also used for the delivery of cable TV signals (CATV). DOCSIS modems are well known in the telecommunications industry and will not be described here in detail.

A Digital Subscriber Line (DSL) modem is also an industry standard type of modem that is used to provide broadband access to the Internet, but over conventional copper phone lines (local loops). DSL modems are well known in the telecommunications industry and will not be described here in further detail.

The term gateway, used interchangeably with broadband gateway, is defined as an integral modem and router, and may include hub functionality. The modem function is used to change voltage fluctuations on an input carrier line (a DSL line input or a cable TV input) into digital data.

Routers are devices that connect one distinct network to another by passing only certain IP addresses that are targeted for specific networks. Hubs allow one network signal input to be split and thus sent to many devices.

Gateway storage peripheral is defined as an add-on storage device with processing power, an operating system, and a software application that manages the downloading and storage of data. An example scenario for the use of a gateway storage peripheral is a system where a user has a DOCSIS modem and would like to add an always-on storage capability. The gateway storage peripheral is connected to the DOCSIS modem via a USB port or an Ethernet port in the DOCSIS modem. A gateway storage peripheral in combination with a DOCSIS modem or any type of broadband modem is considered a storage gateway system. A PC that is always left on and connected to an always-on gateway with a DSL or broadband cable connection is considered a storage gateway system.

The term "message" is defined as information that is sent digitally from one computing device to another for various purposes. The term "content" is used to mean the information contained in digital files or streams. For example, content may be entertainment or news, or audio files in MP3 format. "Data" is used to mean information such as digital schedule contents, responses from devices sent back through the system, or digital messages and email. "Content" and "data" are sometimes used interchangeably. "Client devices" are those devices that are not fully functional without a host device such as a personal computer.

Local Area Network (LAN) is defined as a network structure that includes two or more devices that can communicate with other devices utilizing a shared communication infrastructure, including wired network technologies, such as Ethernet, or wireless network technologies such as Institute of Electrical and Electronics Engineers (IEEE) 802.11 b or HomeRF technology. Wireless LAN technology such as IEEE 802.11 b and HomeRF are based on the unlicensed 2.4 Ghz ISM (Industrial, Scientific, and Medical) frequency band. These networking technologies utilize Transmission Control Protocol/internet Protocols (TCP/IP) protocols.

A LAN typically constitutes a group of interconnected devices that share a common geographic location and are typically grouped together as a subnet. A local network, for example, would be a home network where several computers and other smart devices would be digitally connected for the purpose of transferring content and data, controlling each other, sharing programming, or presenting data and content to a user.

CODEC (Compression/Decompression algorithm) is a software application that is used to decode (uncompress) encoded (compressed) media files or streams. Most content is stored and sent in a compressed format so that the content files are smaller and thus take up less storage space and use less bandwidth when being transferred via the Internet. The content is then decoded at the playback device. For example, MP3 audio files are encoded and must be decoded by a microprocessor running the codec in order for the audio content to be presented to the user in an analog format.

HTTP is Hyper-text transfer protocol, the protocol used by Web browsers and Web servers to transfer files, such as text and graphic files. Data-rate is defined as the data throughput of a telecommunications system or technology, and is measured in a quantity of bits per second, such as millions of bits per second (Mbps).

Overview of Operation

Figure 1:
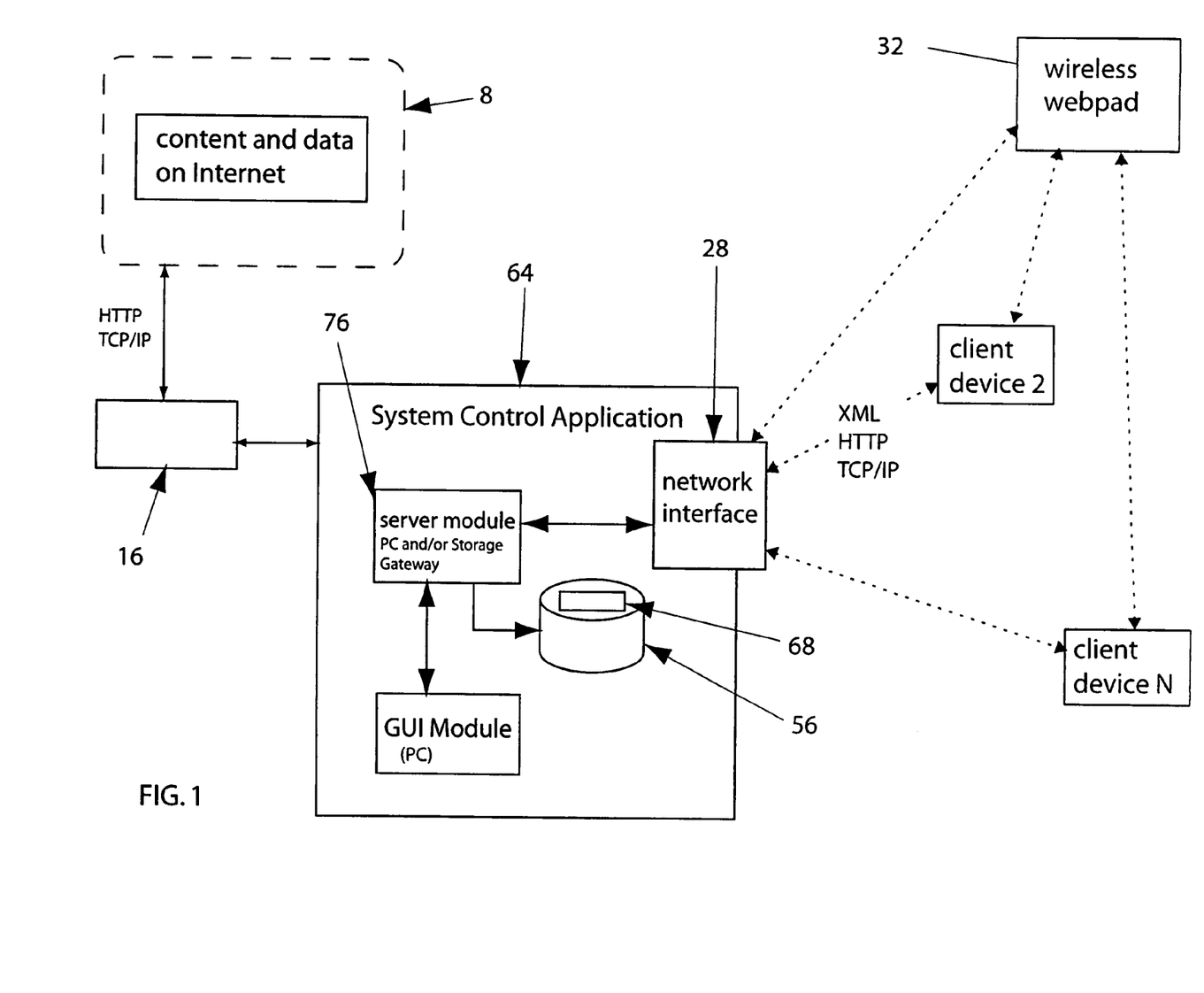
FIG. 1 shows a schematic of one embodiment of the wireless webpad system.

Referring now to FIG. 1, the fundamental operation of the wireless webpad 32 system involves LAN transmission of digital content and services from a local server that is a PC in one embodiment. Content and communication services are received via PC but can originate on the Internet 8, using the PC as a proxy server. Wireless webpad 32 receives the digital content and communications and processes it in various ways.

Figure 2:
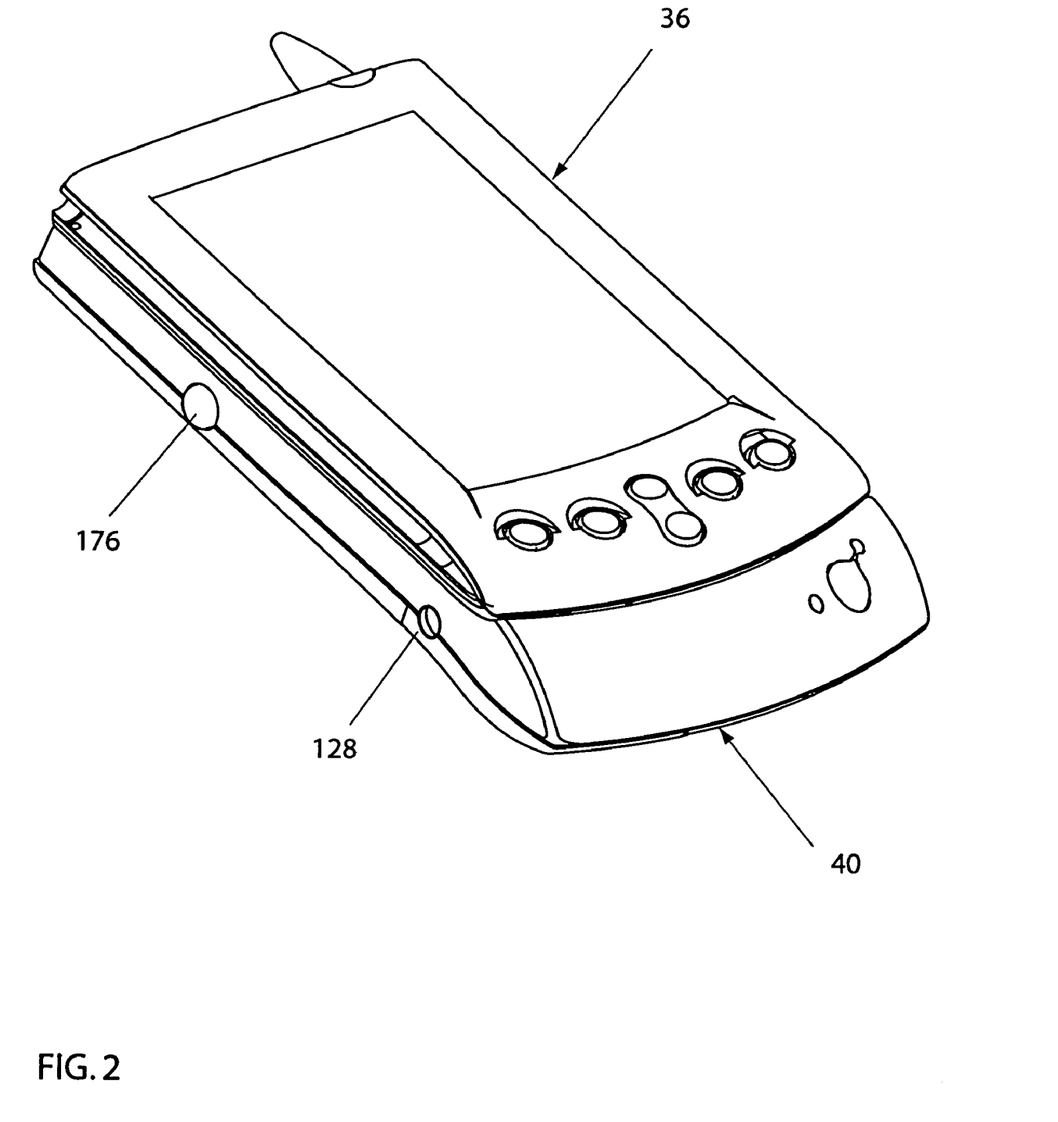
FIG. 2 shows an isometric view of one embodiment of a webpad that is a PDA attached to a wireless LAN adapter.

In one embodiment, webpad 32, shown in FIG. 2, is a PalmV PDA 36 manufactured by Palm Computing. The PDA 36 is attached to a wireless LAN adapter 40. The PC is also functionally connected via a USB connection to a wireless radio frequency (RF) LAN access point 28, such that digital content from PC is transmitted to nodes on the LAN 48.

The Function of the PC and Broadband Connection in the System

In one embodiment, the function of PC in the wireless webpad 32 system is to acquire, store, manage, and serve digital content and interactive services to wireless webpad 32. Digital content is stored on PC hard disk drive 56. PC gains access to digital audio and video content several ways. In one embodiment PC is also connected to Internet 8 via a broadband cable modem 16. Thus PC has access via content services to downloadable digital audio files such as MP3 formatted audio files, MPEG-2 and MPEG-4 video files, as well as digital audio and video streams from Internet 8 servers.

In one embodiment, the user can also manually convert CD audio files into MP3 files, a process known as "ripping". PC can also route Internet 8 streams of content to webpad 32. In other embodiments, PC is connected to Internet 8 through a dial-up modem connection to an ISP, or Digital Subscriber Line (DSL), or a fixed wireless broadband connection.

Discussion of Wireless LAN Adapter 40—Mechanical Description

Figure 3:
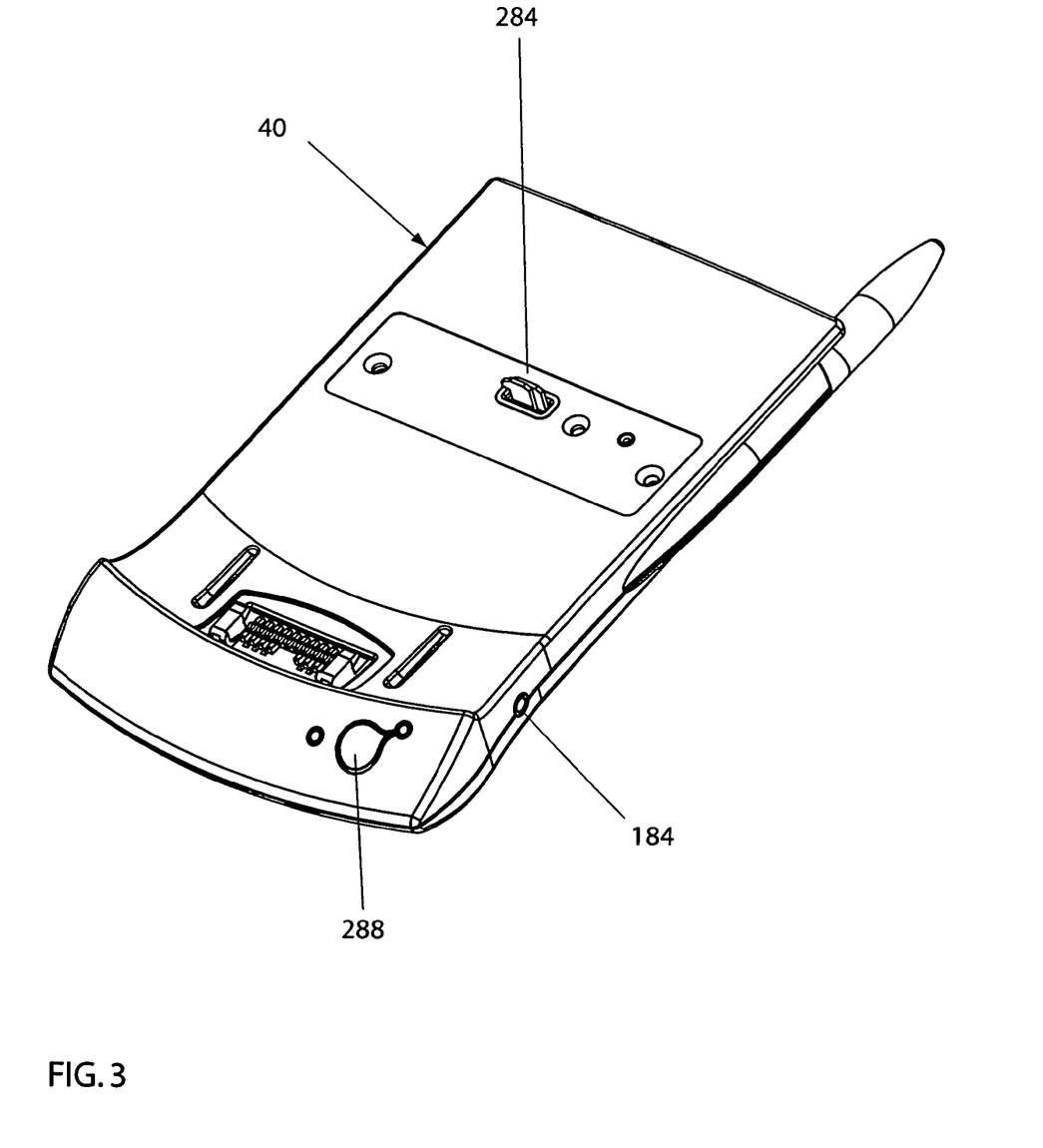
FIG. 3 shows an isometric view of one embodiment of a wireless LAN adapter.

As shown in FIG. 2, PDA 36 docks with wireless LAN adapter 40 with a spring loaded mechanical attachment that includes a latch hook 284. The latch hook 284 is shown in FIG. 3. In one example where the PDA 36 is a Palm, Palm Computing provides a reference design for connecting to the PalmV with the use of a small slot on the bottom side of the PalmV housing. PDA 36 is released from wireless LAN adapter 40 by pressing button 176. Electrical contacts on the rear end of PDA 36 make contact with electrical contacts on wireless LAN adapter 40 in order to establish a data communication link.

FIG. 3 shows wireless LAN adapter 40 without PDA 36 attached. In one embodiment, the lower part of wireless LAN adapter 40 has the same shape as the lower part of PDA 36, and includes the same electrical contacts as PDA 36 electrical contacts in order to fit in to and utilize the existing PDA 36 docking cradle. By placing PDA 36 attached to wireless LAN adapter 40 into PDA 36 docking cradle, both the PDA 36 battery and the battery 104 included in wireless LAN adapter 40 are alternatively charged.

Figure 4:
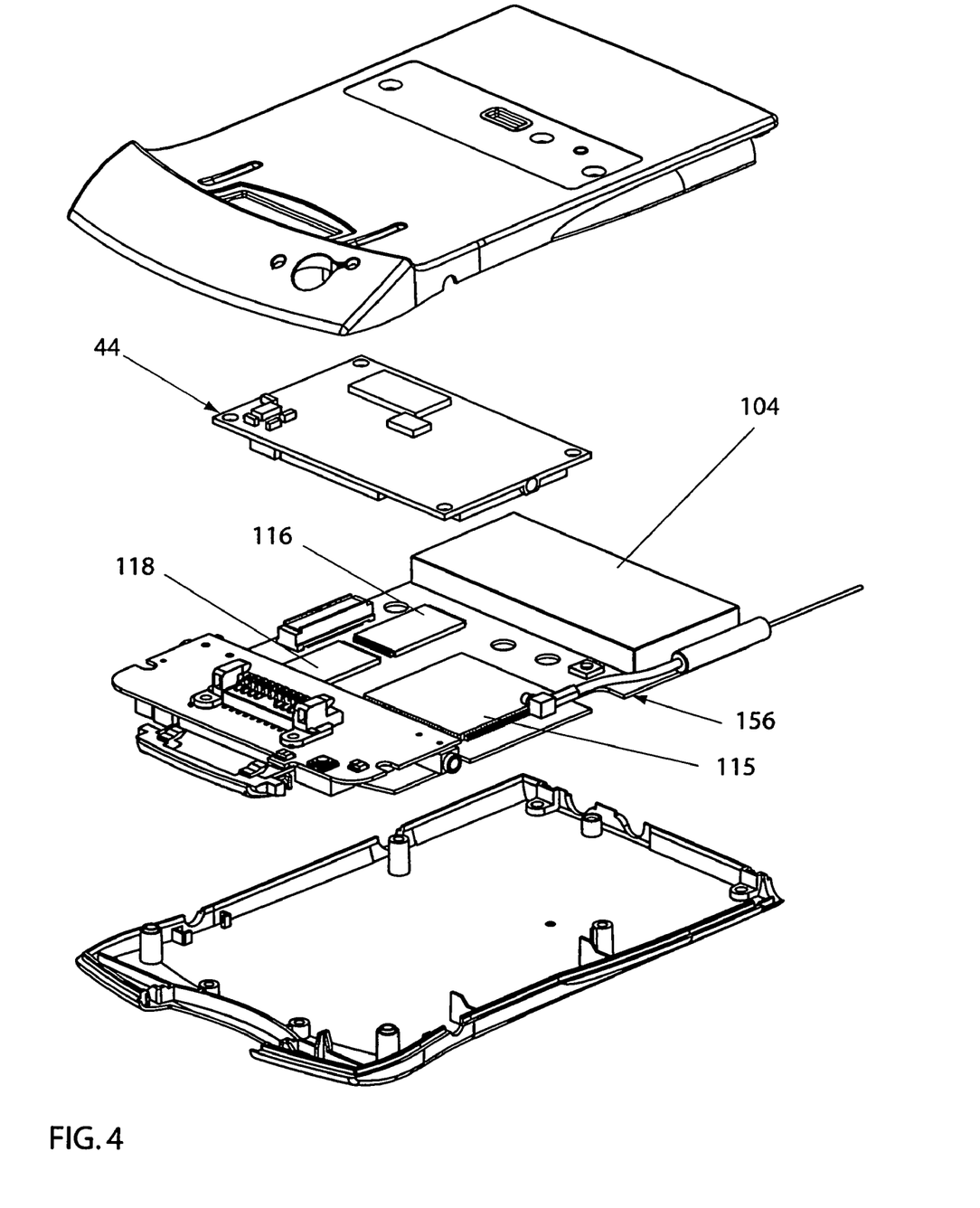
FIG. 4 shows an exploded view of one embodiment of a wireless LAN adapter.

Referring now to FIG. 4, an exploded view of wireless LAN adapter 40 shows a typical two-piece plastic shell construction as well as other components. Internal hardware components include a motherboard 156 that contains the electronic components that constitute the functional data-manipulating aspect of the device.

Electrical Description

Figure 5:
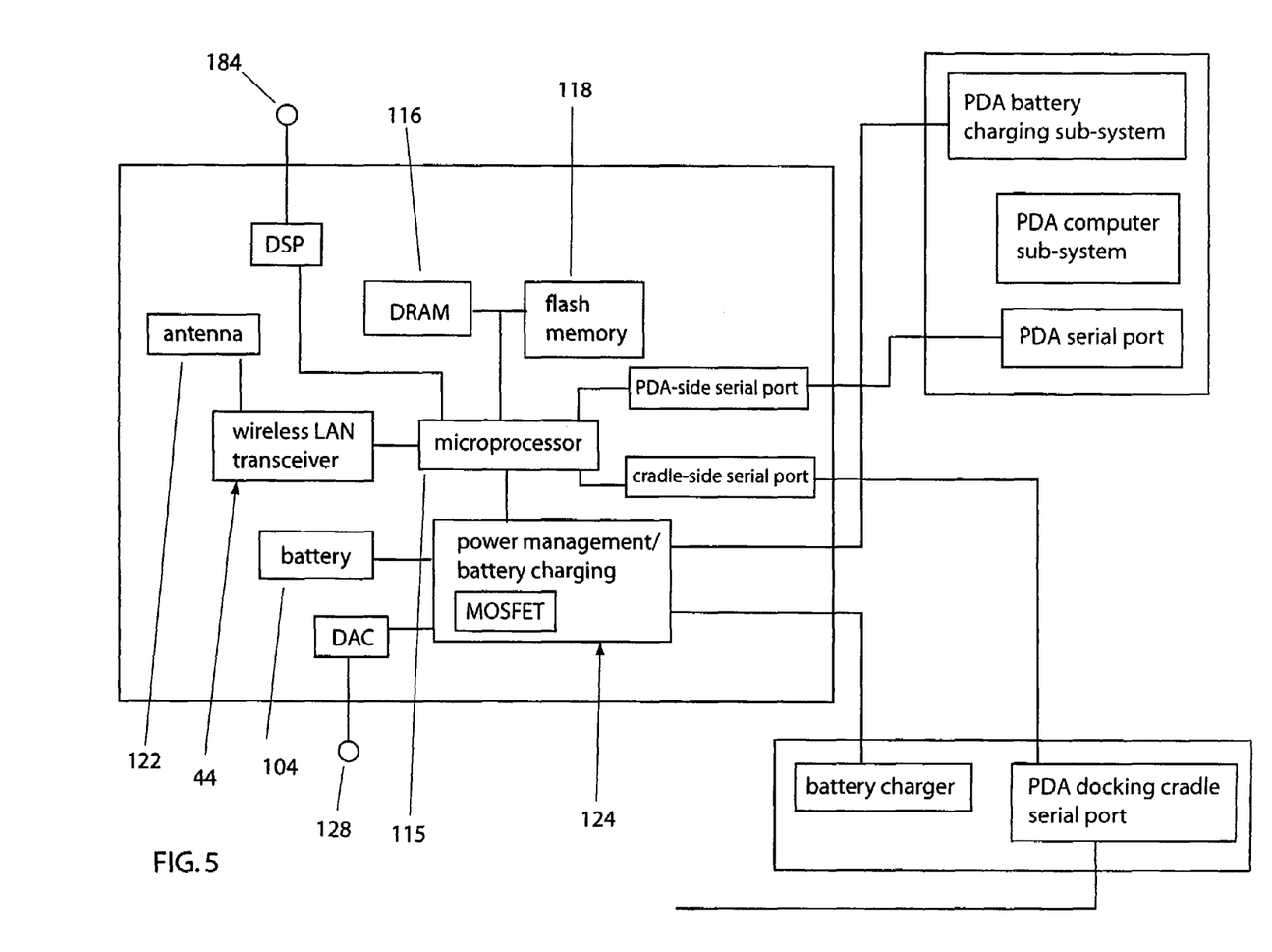
FIG. 5 is a block diagram of one embodiment of the electronic components in the wireless LAN adapter.

FIG. 5 shows a block diagram of the electrical components in wireless LAN adapter 40. Motherboard 156 electrically connects components including a microprocessor 115, dynamic memory (DRAM) 116, programmable (flash) memory 118, a power regulation and battery charging subsystem 124, a digital signal processor (DSP) 140, battery 104, a headset jack 184, and a stereo audio out jack 128. A wireless LAN transceiver 44 is functionally connected to motherboard 156.

In one embodiment, wireless LAN adapter 40 also includes a digital-to-analog converter (DAC) 121 for converting the uncompressed digital information into analog signals that are presented at the stereo audio out jack 128. Microprocessor 115 in combination with DRAM memory 116 executes instructions from the real time operating system 92 and control firmware 96. In an alternative embodiment, wireless LAN adapter 40 includes a charge-coupled device (CCD) chip and a lens, the function of which will be explained later in this disclosure.

Description of Wireless LAN Transceivers (Card in LAN Adapter)

Wireless LAN transceivers 44 are capable of sending and receiving data using radio frequencies via a wireless data transfer protocol. Technology for such a LAN 48 is currently available and includes the Symphony wireless networking access point provided by Proxim, Inc. LAN systems such as this are based on RF modulation centered on the 2.4 GHz frequency band. Such LANs have a practical range of approximately 150 feet and are capable of reaching most areas in an average sized house were webpad 32 might be located.

In another embodiment, the wireless LAN access point 28 is a PCI card that is located internal to the PC, with an external antenna 122. In another embodiment, the wireless LAN communication link 48 is provided using IEEE 802.11 b protocols. In another embodiment wireless LAN communication link 48 is provided using Bluetooth protocols.

Wireless Webpad Software and Functionality

Figure 6:
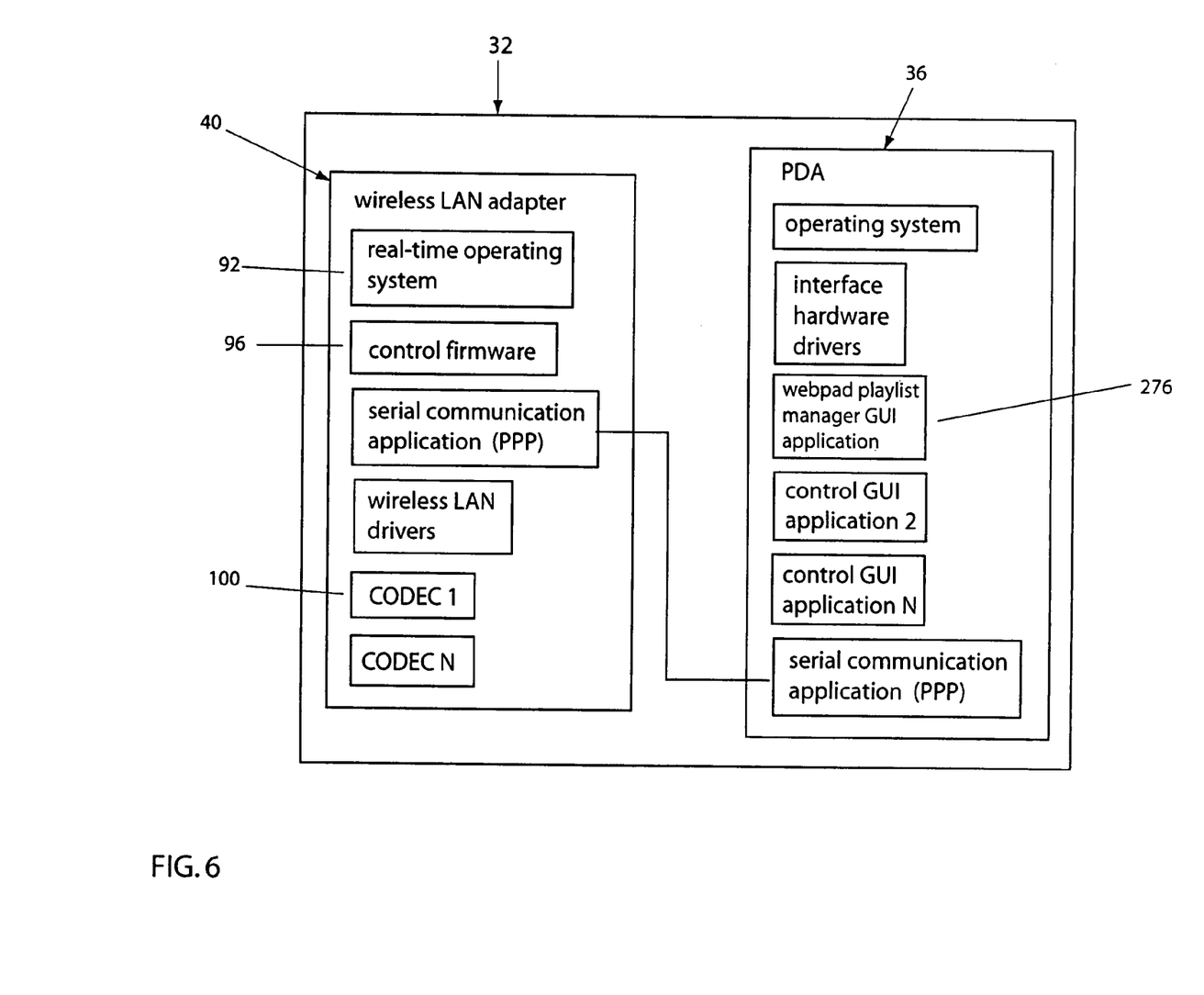
FIG. 6 is a block diagram of one embodiment of the software components in the wireless webpad.

Wireless webpad 32 functions are the combined functions of PDA 36 and wireless LAN adapter 40. FIG. 6 is a block diagram of the location of various software functions in wireless webpad 32. PDA 36 is used primarily for its user-interface capabilities. Many functions require the computer processing power of wireless webpad 32. For example, microprocessor 115 in combination with DAC 121 and CODEC 100 in wireless LAN adapter 40 is capable of decoding digital audio files. Microprocessor 115 in combination with DSP 140 and a microphone input is capable of digitizing sound inputs.

Device Software—CODECs

In one embodiment, wireless LAN adapter 40 includes the Fraunhofer CODEC in wireless LAN adapter 40, licensed for use by Thomson Electronics for decoding the digital audio file that is streamed to it from PC. CODEC 100 is an executable file stored in memory, launched by control firmware 96, executed by real time operating system 92 running on wireless LAN adapter 40. Wireless LAN adapter 40 may store a multiple CODECs in memory 118 in wireless LAN adapter 40 for decoding variously formatted digital audio files that may be selected by the user. For example, the WindowsMedia CODEC, provided by Microsoft may be stored in memory 118 at wireless webpad 32.

Software Module—System Control Application 64

FIG. 1 lists the software components of wireless webpad 32 system that are included at PC. FIG. 6 lists the software elements of wireless LAN adapter 40 and PDA 36.

The system control application 64 is software executing on PC that manages communication and streaming from PC to wireless webpad 32. System control application 64 includes a server module 76 that is a Java application. System control application 64 also includes a database module 68 that is written to or accessed by server module 76, and a series of graphical user interface (GUI) modules, that provide user interfaces for setting up content to be accessed by or streamed to wireless webpad 32, as well as other devices on the LAN. One instance of GUI module is a Windows application that runs on PC. Another instance of GUI module is a native application for PDA 36 operating system.

An example of webpad 32 GUI is the webpad playlist manager GUI application 276 that features a three-level nested list structure for organizing digital audio content. The three levels are labeled as channels, playlists, and tracks. Channels are lists of playlists, and playlists are lists of tracks. Track is a GUI representation of a locally cached digital audio file or a digital audio stream from Internet 8. Audio content services are also available through online services accessed through a browser interface on webpad 32. The online digital audio files associated with online playlist titles in the online playlists are streamed to wireless webpad 32 via PC and wireless LAN communication link 48. Server module 76 includes software that interfaces with the protocols of each online audio service provider to allow online playlists to be downloaded and transferred into database module 68. Thus, playlist structures and playlist titles created online using the web-based content selection guide are available and can be interacted with by the user with the webpad playlist manager GUI application 276 running on wireless webpad 32.

Software Functions—Communication/Message Processing

The communication and control functions of the wireless webpad 32 system will now be described. In one embodiment, a user may use wireless webpad 32 GUIs to control the function of wireless webpad 32 and other client devices connected to the system.

For example, the user makes selections on webpad playlist manager GUI application 276 using the stylus with the touch screen LCD 136. These interactions are processed by the microprocessor 115 and operating system in PDA 36, and messages are sent to control firmware 96 in wireless LAN adapter 40 via the serial port interface. These messages are then converted into XML-based messages and sent via HTTP requests to system control application 64 on PC via wireless LAN 48. These messages are interpreted by server module 76 running on PC and specific actions are initiated. Applications enabled by the wireless webpad 32 system are discussed below.

System Function—Local Browsing

System control application 64 includes server module 76 that operates as a server for webpad 32. A database of information can be maintained on PC such as yellow pages directories, white pages directories, TV Guide, and the like. Database module 68 stores the locations of the local content files. Because of the speed of LAN 48, access to this information is very fast. In this embodiment PDA 36 GUI is a browser that accesses the server with HTTP requests.

System Function—Internet 8 Browsing

Server module 76 also acts as a router and network address translator, allowing the user to use the browser application on the PDA 36 to access web pages on Internet 8. The browser application on PDA 36 can receive world wide web URLs entered by the user, and server module 76 will route these requests through to the wide area connection, such as a broadband Internet 8 connection. The responses back from Internet 8 are routed through to webpad 32.

System Function—Streaming Audio

An aspect of control firmware 96 on wireless LAN adapter 40 in combination with webpad playlist manager GUI application 276 on the PDA 36 provides the ability to initiate and control a real-time digital audio or video stream from server module 76 on PC. Webpad playlist manager GUI application 276 on PDA 36 also provides the standard controls for starting, stopping, pausing, progressing to the next track, and the like. These controls are GUI elements on the touch screen LCD 136. The user activates the control GUI elements with the stylus.

The interaction of control firmware 96 with server module 76 provides a buffer management function that controls the flow of portions of the digital audio file from PC into a local DRAM memory of wireless webpad 32. The buffer management function insures that the local DRAM memory buffer is filled as the contents of DRAM are decoded by microprocessor 115 executing CODEC 100. DAC 121 converts the decoded digital audio into analog signals that are presented at the head phone jack 128 on wireless LAN adapter 40. The user listens to the audio stream using a stereo headset plugged into earphone jack 128.

System Function—TV Synchronization Mode

System control application 64 can run on a set-top box that includes a digital cable converter and a DOCSIS cable modem. In this scenario, system control application 64 can receive information as to the current cable channel that the digital cable converter is tuned to. The set-top box makes the currently playing content channel available to system control application 64. The Internet 8 connection integral to the set-top box enables a function of system control application 64 to use an online lookup function in combination with an online programming guide database to obtain a text description of the currently playing content. Further, an Internet 8 search function can be used to gather ancillary content links, defined as links to websites that relate to the text descriptors of the currently playing content. These ancillary content links are automatically sent to webpad 32 when TV synchronization mode is activated on webpad 32. The result is that while watching a TV program such as movie or an advertisement, related links are immediately sent to webpad 32.

Using the above example of ancillary content sent automatically to the webpad 32, activation by the user of a GUI tag button displayed on webpad 32 LCD 136 that is associated with the ancillary content currently displayed on LCD 136, results in the transmission of a message back through LAN 48 informing system control application 64 that tag button was activated. Server module 76 then compiles and transmits tag message to a tag storage and processing server. The information in tag message is associated with the currently playing content and may include but is not limited to: metadata or meta-tags (ID3 data) included in the file or stream (characters or images); the file name if content is a file; the URL or IP address of the stream if content is a stream; time; date; and user identifier. Other ancillary content is then aggregated a web page that is accessible to the user of the system.

System Function—Voice-Over-IP Mode

In one embodiment, wireless LAN adapter 40 includes DSP 140 for digitizing audio inputs. A headset, which is a combination earphone and microphone, is plugged into headset jack 184 on wireless LAN adapter 40. When a voice-over-IP call is initiated using a GUI on PDA 36, DSP 140 in concert with microprocessor 115 and control firmware 96 converts the analog voice signal into digital packets in real time and sends this information via LAN communication link 48 to server module 76 on PC. Server module 76 on PC routes these packets to the appropriate voice-over-IP server on Internet 8. It is assumed that Internet 8 voice-over-IP service is used. FIG. 3 shows that wireless LAN adapter 40 includes an answer button 288 that is connected electrically to microprocessor 115 and allows convenient one-button activation when answering voice-over-IP calls. Volume up and volume down buttons are also included in wireless LAN adapter 40.

System Function—Voice-Recording Mode

DSP 140 and microprocessor 115 constitutes a audio digitizing subsystem that can be used to digitize voice messages. A GUI on PDA 36 allows the user to initiate and stop a recording interval, similar to controls on many audio recording devices. As the recording is taking place, the audio signal is digitized and sent in large blocks that are re-constructed by system control application 64. The resulting audio files are stored on PC, or can be sent other users as email attachments. The GUI on PDA 36 also includes an address book for selection the recipient of the audio message.

System Function—Image Data Transfer

Image data transfer occurs in two modes: still camera function and video camera function. Both of these modes use the embodiment of wireless LAN adapter 40 that includes a CCD chip and lens subsystem described above. The output of a CCD ship is a single frame or a sequence of frames that are an array of pixels. In still image transfer mode, one digital frame is sent to PC via wireless LAN communication link 48 and stored in database 68. This digital image can be saved in a variety of standard image formats such as JPEG or TIFF formats. A GUI on PDA 36 provides for activation of the still image camera function.

In video camera mode, digital video frames are captured by the CCD subsystem and encoded in MPEG-4 format, and sent in real time via the wireless LAN communication link, to system control application 64. A video compilation software application that is an element of system control application 64 appends these frames into an MPEG-4 video file. In an alternative embodiment, the MPEG-4 stream can be routed by the server module 76 to a server on the Internet 8 where the stream can be accessed by a third party. A GUI on PDA 36 allows for the starting and stopping of streaming video from wireless webpad 32.

Network Device Control

In one embodiment, by connecting a network module to various other electronic devices, these devices become nodes in the LAN 48 and can be manipulated by software on PC as well as with GUI control applications running on webpad 32. Examples of other networked devices could include, but are not limited to, a television, stereo, oven, HVAC system, lights, video camera security systems, video baby monitors, and door locks, among others. LAN adapters connected to electronic devices differ according to the functions of each device but include a wired or wireless transceiver and other necessary control circuitry.

PC with wireless LAN access point 28 and system control application 64 is the fixed central controller for all these devices and can be used to perform various control functions such as on/off control. Webpad 32 is used as the portable central controller for these networked devices. In an example scenario, a user can use webpad 32 in concert with a wireless LAN video module that is pointed to an infant located in a house.

As another example, webpad 32 can be used to control a digital audio converter, a device that is a node on the LAN and is able to receive digital audio streams from PC, decode and convert the stream into analog signals that are plugged into any existing stereo system. Webpad playlist manager GUI application 276 that is used to manage playlists and control streams into webpad 32 can be used to control audio content delivered the digital audio converter. A GUI element in webpad playlist manager GUI application 276 allows the user to select either digital audio converter or webpad 32 as the target device for the audio stream.

In one embodiment, a further use of webpad 32 as a device controller entails using the built in infrared (IR) capabilities on PDA 36s. Webpad 32 can use its IR transmitter to communicate directly with electronic devices with IR receivers such as televisions and stereos, or with an IR enabled amplifier module attached. The specific IR configurations for individual electronic devices can be downloaded from Internet 8 by PC, stored on PC and then sent to webpad 32. In an example scenario, webpad 32 is used to control the television. The user requests to use PDA 36 as a TV remote controller by making a selection to his effect on a GUI on webpad 32. The makes selections on the AV control GUI on webpad 32 both to lower the volume of the TV and to watch a specific program being broadcast. Previously, webpad 32 downloaded the relevant IR configurations for the TV from Internet 8 through PC. Webpad 32 then transmits the IR data to the TV.

ALTERNATIVE EMBODIMENTS

The wireless LAN adapter has several permutations that have not yet been explicitly mentioned but are implied: the module can include an external antenna 122; the audio in/out jack and/or the stereo out jack and its associated function can be regarded as optional on the device; the CCD and its associated functions can be viewed as optional on the device; the IR capabilities and its associated functions on the PDA can be viewed as optional on the PDA; the IR capabilities and its associated functions can be incorporated directly into the wireless LAN adapter; the CCD and its related functions can be added to the system by attaching a CCD camera plug-on adapter module directly to the PDA (PDAs such as the Palm Pilot, manufactured by Palm Computing, and the Visor, manufactured by Handspring, offer optional CCD camera plug-on adapters); the wireless LAN adapter may include a conventional power jack and be recharged through a charging module unassociated with the PDA. Other permutations and embodiments exist that are not explicitly listed above.

Embodiment with PDA with Decoding Capability

PDAs such as the iPaq include microprocessors that are capable of decoding digital audio and video streams, as well the capability to store a quantity of digital content files in internal memory. In another embodiment, an iPaq includes a CompactFlash wireless LAN card and an integrated control and GUI software application that provides the capability of communicating with the system control application as well as all of the functions of the webpad described above.

Embodiment with Gateway Node

For example, another method for providing an Internet connection to the webpad is to include a gateway node, a device that is a wireless LAN to ethernet converter. The gateway node system is used when there is an existing Internet connection such as a DSL connection or a cable modem connection. An example system would include a broadband gateway that is also a hub, such as the Netopia 3100 router, made by Netopia. The Netopia router performs routing and hub functions in addition to other functions such as being a DHCP server (it dynamically serves up internet protocol addresses). The Netopia router has several physical connection ports. In one port it receives a connection to the Internet, such as a DSL connection. There are several other physical ports that are Ethernet ports. The gateway node in this case would convert Ethernet protocol to the wireless LAN protocol, and broadcast them. The gateway node would alternatively receive RF signals from the webpad module and convert them to Ethernet protocol messages. By using a gateway node, the webpad assembly is capable of communicating with the Internet without the use of a home PC.

Depending on which PDA is used and how much computing power is available, various functions described above may be executed by the processor located in the wireless LAN adapter, or they may be executed by the processor in the PDA. Or both processors may share the computing load.

Alternative Embodiment—Wireless Connection to Streaming Player with Storage

In another embodiment, wireless LAN adapter includes a large quantity of battery-backed up static RAM, or SRAM that allows the webpad to store a quantity of data. For example, the user selects a number of digital audio tracks on the PC using the GUI on the wireless webpad that are to be downloaded and stored on the webpad. The battery backed-up SRAM stores the files so the user can access and listen to the digital audio files away from the wireless LAN communication link.

In another embodiment, the wireless LAN adapter may include a card slot for accepting CompactFlash memory cards. In this case, the digital audio files transferred from the PC to the wireless webpad are stored in CompactFlash memory, and the user may listen to the audio files beyond the vicinity of the LAN communication link.

A webpad and method for using the same have been described. Although the present invention is described herein with reference to specific embodiments, many modifications and variations therein will readily occur to those with ordinary skill in the art. Accordingly, all such variations and modifications are included within the intended scope of the present invention as defined by the following claims.

What is claimed is:

1. An adaptor module for use in connection with a personal digital assistant having a rechargeable first battery and a first electrical connector and a docking station having a second electrical connector, the adaptor module comprising:
   a housing sized and arranged to releasably secure the personal digital assistant;
   a third electrical connector carried by the housing for interfacing with the first electrical connector of the personal digital assistant;
   a fourth electrical connector carried by the housing for interfacing with the second electrical connector of the docking station; a rechargeable second battery; and
   a battery charging circuit which uses a charge received via the interface between the fourth electrical connector and the second electrical connector to selectively provide a charge to the rechargeable second battery and the rechargeable first battery via the interface between the third electrical connector and the first electrical connector;
   wherein an end of the housing has a shape which is adapted to be received in the docking station and which corresponds to a shape provided to an end of the personal digital assistant, wherein the end of the housing carries the third and fourth electrical connectors, and wherein the fourth electrical connector is located in a location which corresponds to a location of the first electrical connector on the corresponding end of the personal digital assistant.

2. The adaptor module as recited in claim 1, wherein communications between the personal digital assistant and the adaptor module are exchanged via the interface between the third electrical connector and the first electrical connector.

3. The adaptor module as recited in claim 2, wherein communications between the docking station and the adaptor module are exchanged via the interface between the fourth electrical connector and the second electrical connector and the fourth electrical connector is linked to the third electrical connector whereby the adaptor module functions as an interface between the docking station and the personal digital assistant.

4. The adaptor module as recited in claim 2, comprising a wireless transceiver for wirelessly transmitting and receiving communications with an appliance, the wireless transceiver being linked to the third electrical connector whereby the adaptor module functions as an interface between the appliance and the personal digital assistant.

5. The adaptor module as recited in claim 2, comprising an output jack carried by the housing and a codec for decoding a digitally encoded media signal received from the personal digital assistant via the interface between the third electrical connector and the first electrical connector whereby an analog signal corresponding to the digitally encoded media signal is provided to the output jack.

6. The adaptor module as recited in claim 4, wherein the appliance provides voice-over-IP services in cooperation with software resident on the personal digital assistant and the housing carries a button that is activatable to provide a means for answering a call initiated through the voice-over-IP services.

7. The adaptor module as recited in claim 2, wherein the housing carries a CCD chip and lens subsystem for capturing a digital image wherein a captured digital image is transferable to the personal digital assistant via the interface between third electrical connector and the first electrical connector.

8. The adaptor module as recited in claim 2, wherein the third electrical connector and the fourth electrical connector each comprise multiple pin connectors.

9. An adaptor module for use in connection with a personal digital assistant having a rechargeable first battery and a first electrical connector and a docking station having a second electrical connector, the adaptor module comprising:
   a housing sized and arranged to releasably secure the personal digital assistant;
   a third electrical connector carried by the housing for interfacing with the first electrical connector of the personal digital assistant;
   a fourth electrical connector carried by the housing for interfacing with the second electrical connector of the docking station; a rechargeable second battery; and
   a battery charging circuit which uses a charge received via the interface between the fourth electrical connector and the second electrical connector to selectively provide a charge to the rechargeable second battery and the rechargeable first battery via the interface between the third electrical connector and the first electrical connector;
   wherein communications between the personal digital assistant and the adaptor module are exchanged via the interface between the third electrical connector and the first electrical connector and wherein communications between the docking station and the adaptor module are exchanged via the interface between the fourth electrical connector and the second electrical connector and the fourth electrical connector is linked to the third electrical connector whereby the adaptor module functions as an interface between the docking station and the personal digital assistant.

10. The adaptor module as recited in claim 9, comprising a wireless transceiver for wirelessly transmitting and receiving communications with an appliance, the wireless transceiver being linked to the third electrical connector whereby the adaptor module functions as an interface between the appliance and the personal digital assistant.

11. The adaptor module as recited in claim 9, comprising an output jack carried by the housing and a codec for decoding a digitally encoded media signal received from the personal digital assistant via the interface between the third electrical connector and the first electrical connector whereby an analog signal corresponding to the digitally encoded media signal is provided to the output jack.

12. The adaptor module as recited in claim 11, wherein the appliance provides voice-over-IP services in cooperation with software resident on the personal digital assistant and the housing carries a button that is activatable to provide a means for answering a call initiated through the voice-over IP services.

13. The adaptor module as recited in claim 9, wherein the housing carries a CCD chip and lens subsystem for capturing a digital image wherein a captured digital image is transferable to the personal digital assistant via the interface between third electrical connector and the first electrical connector.

14. The adaptor module as recited in claim 9, wherein the third electrical connector and the fourth electrical connector each comprise multiple pin connectors.

15. An adaptor module for use in connection with a personal digital assistant having a rechargeable first battery and a first electrical connector and a docking station having a second electrical connector, the adaptor module comprising:
   a housing sized and arranged to releasably secure the personal digital assistant;
   a third electrical connector carried by the housing for interfacing with the first electrical connector of the personal digital assistant;
   a fourth electrical connector carried by the housing for interfacing with the second electrical connector of the docking station; a rechargeable second battery;
   a battery charging circuit which uses a charge received via the interface between the fourth electrical connector and the second electrical connector to selectively provide a charge to the rechargeable second battery and the rechargeable first battery via the interface between the third electrical connector and the first electrical connector; and
   a wireless transceiver for wirelessly transmitting and receiving communications with an appliance, the wireless transceiver being linked to the third electrical connector whereby the adaptor module functions as an interface between the appliance and the personal digital assistant;
   wherein communications between the personal digital assistant and the adaptor module are exchanged via the interface between the third electrical connector and the first electrical connector.

16. An adaptor module for use in connection with a personal digital assistant having a rechargeable first battery and a first electrical connector and a docking station having a second electrical connector, the adaptor module comprising:
   a housing sized and arranged to releasably secure the personal digital assistant;
   a third electrical connector carried by the housing for interfacing with the first electrical connector of the personal digital assistant;
   a fourth electrical connector carried by the housing for interfacing with the second electrical connector of the docking station; a rechargeable second battery;
   a battery charging circuit which uses a charge received via the interface between the fourth electrical connector and the second electrical connector to selectively provide a charge to the rechargeable second battery and the rechargeable first battery via the interface between the third electrical connector and the first electrical connector; and
   an output jack carried by the housing and a codec for decoding a digitally encoded media signal received from the personal digital assistant via the interface between the third electrical connector and the first electrical connector whereby an analog signal corresponding to the digitally encoded media signal is provided to the output jack;
   wherein communications between the personal digital assistant and the adaptor module are exchanged via the interface between the third electrical connector and the first electrical connector.

17. The adaptor module as recited in claim 16, wherein the appliance provides voice-over-IP services in cooperation with software resident on the personal digital assistant and the housing carries a button that is activatable to provide a means for answering a call initiated through the voice-over-IP services.

18. An adaptor module for use in connection with a personal digital assistant having a rechargeable first battery and a first electrical connector and a docking station having a second electrical connector, the adaptor module comprising:

a housing sized and arranged to releasably secure the personal digital assistant;

a third electrical connector carried by the housing for interfacing with the first electrical connector of the personal digital assistant;

a fourth electrical connector carried by the housing for interfacing with the second electrical connector of the docking station; a rechargeable second battery; and a battery charging circuit which uses a charge received via the interface between the fourth electrical connector and the second electrical connector to selectively provide a charge to the rechargeable second battery and the rechargeable first battery via the interface between the third electrical connector and the first electrical connector;

wherein communications between the personal digital assistant and the adaptor module are exchanged via the interface between the third electrical connector and the first electrical connector and wherein the housing carries a CCD chip and lens subsystem for capturing a digital image wherein a captured digital image is transferable to the personal digital assistant via the interface between third electrical connector and the first electrical connector.

\* \* \* \* \*

UNITED STATES PATENT AND TRADEMARK OFFICE
CERTIFICATE OF CORRECTION

| | | |
|---|---|---|
| PATENT NO. | : 7,660,601 B2 | Page 1 of 1 |
| APPLICATION NO. | : 11/169354 | |
| DATED | : February 9, 2010 | |
| INVENTOR(S) | : Janik et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 793 days.

Signed and Sealed this
Eleventh Day of January, 2011

David J. Kappos
*Director of the United States Patent and Trademark Office*